June 17, 1958 A. L. ROSENBERG, JR 2,839,730

TRANSMISSION LINE TERMINATION

Filed Sept. 15, 1954 2 Sheets-Sheet 1

INVENTOR.
ALBERT L. ROSENBERG, JR.
BY
J. C. Whittaker
ATTORNEY

TRANSMISSION LINE TERMINATION

Filed Sept. 15, 1954 2 Sheets-Sheet 2

INVENTOR.
ALBERT L. ROSENBERG, JR.
BY J. L. Whittaker
ATTORNEY

United States Patent Office 2,839,730

Patented June 17, 1958

2,839,730

TRANSMISSION LINE TERMINATION

Albert L. Rosenberg, Jr., Camden, N. J., assignor to Radio Corporation of America, a corporation of Delaware Application September 15, 1954, Serial No. 456,200

5 Claims. (Cl. 333—22)

The present invention relates to an improved termination for a transmission line and, in particular, to an improved termination for a coaxial transmission line.

A transmission line terminated in its characteristic impedance is ordinarily free of reflections. However, at the frequencies coaxial cables are commonly employed a perfect termination is difficult to achieve because connections between a terminating resistor and the cable introduce uncompensated inductive reactive components.

It is a general object of the present invention to provide a purely resistive termination for a transmission line.

It is another object of the present invention to provide an improved termination for a transmission line which terminates the line in its characteristic impedance over a broad frequency band.

It is a further object of the present invention to provide an improved termination for a transmission line wherein undesirable reactive components of a terminating resistor may be balanced out by distributed rather than lumped reactances.

It is yet another object of the present invention to provide a terminating device wherein an ordinary, commercially available resistor may be used as the terminating impedance of a transmission line.

Still another object of the present invention is to provide a termination device for a coaxial transmission line which is simpler, cheaper and easier to adjust than prior art terminating devices.

A typical embodiment of the present invention includes a resistor, such as a commercially available resistor, connected at opposite ends thereof to the terminating ends of a pair of conductors forming a transmission line. Preferably the resistor has a value equal to the characteristic impedance of the transmission line. When so connected, objectionable distributed inductive reactances are often introduced which provide a mismatch at the terminating end of the transmission line. This inductive reactance is compensated for by adjusting the distributed capacitance between the resistor and one of the conductors forming the transmission line.

The invention is particularly applicable to coaxial transmission lines. In a preferred form of the invention, a tubular conductive member is connected at one end to the outer conductor of the coaxial line and forms an extension of the line. A resistor having a value of resistance substantially equal to the characteristic impedance of the coaxial line is coaxially arranged within the tubular member and connected at one end to the center conductor of the coaxial line at the terminating end of the line. Means are provided for connecting the other end of the resistor to the tubular conductor, preferably at the other end thereof. When so connected, undesirable distributed inductive reactive components may be introduced which provide a mismatch at the terminating end of the coaxial line. These are balanced out by adjusting the spacing between the resistor and the tubular member.

In one embodiment of the invention the spacing is adjusted by providing an off-centered screw arranged in an end wall of the tubular member. The resistor is conductively connected to a peripheral edge section of the screw so that the latter is rotated the spacing between the resistor and tubular member is changed.

In another form of the invention a member is provided having a conductive surface arranged for at least a portion of its extent substantially parallel to the surface of the resistor. The spacing of the conductive surface with respect to the resistor is adjustable whereby the distributed capacitance effect is also adjustable.

In another embodiment of the present invention a fairly stiff, resilient member is provided between an end of the resistor and an adjustable member mounted in an end wall of the tubular member and/or the other end of the resistor and the connection means to the coaxial line. The adjustable member may comprise a screw. When it is moved axially with respect to the tubular member, the spacing between the latter and the resistor is changed due to the bowing of the resilient member or members. This adjusts the effective distributed capacitance between the resistor and the outer conductor of the coaxial line.

In still another form of the present invention the tubular conductor is provided with a conductive, conically shaped inner extension and the resistor is provided with a complementary conductive, conically shaped outer extension. Means are provided for moving the resistor axially of the tubular member whereby the spacing between the two conically shaped conductive members is changed thereby changing the effective distributed capacitance between the outer conductor of the coaxial line and the resistor.

The invention will be described in greater detail by reference to the following description taken in connection with the accompanying drawing in which.

Figure 1:
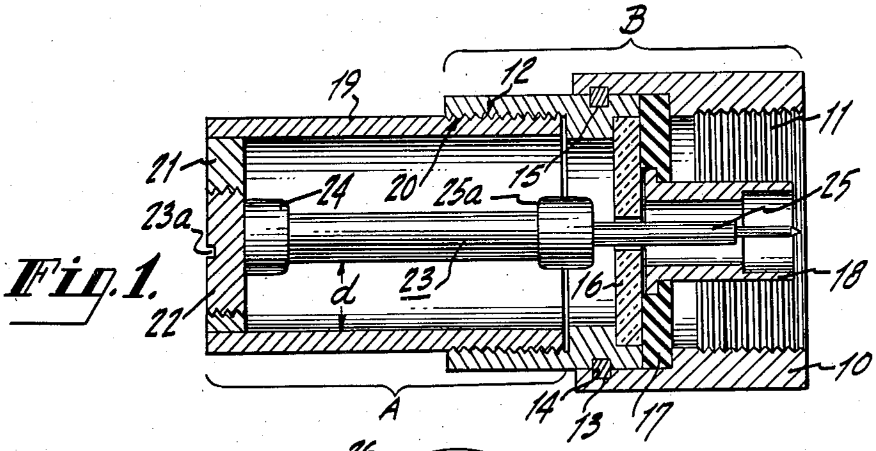
Fig. 1 is a cross-sectional view of a typical embodiment of the present invention.

Figure 1 shows the device A of the present invention connected to a conventional coaxial connector B. The coaxial connector includes a conductive cylindrical member 10 formed with threads 11 on the inner surface thereof and rotatably engaged with a second cylindrical member 12. Cylinders 10 and 12 are held together by an annular ring 13 which fits into an annular groove 14 on the inner surface of member 10 and an annular groove 15 on the outer surface of member 12. An annular dielectric member 16 and an annular insulating member 17 serve to support conductive cylindrical contact member 18.

As will be understood by those skilled in the art, member 10 of connector B may be directly connected to a conventional male coaxial cable termination. In such case, contact member 25 engages the terminal connected to the inner conductor of a coaxial line and threads 11 and contact member 18 engage the terminal fitting connected to the outer conductor of a coaxial line.

The terminating device A illustrated in Fig. 1 includes a tubular conductive member 19 formed with external threads 20 at one end thereof to permit engagement thereof with member 12. At its other end member 19 is provided with a conductive end cap 21 conductively secured to member 19 as by soldering, brazing, or the like. Located in an off-centered aperture in member 21 is a flat screw 22 provided with a slot 23a. Resistor 23 is secured at one conductive end cap 24 thereof to screw 22 and at the other conductive end cap 25a thereof to contact member 25. The resistor, in one position thereof, is coaxially arranged within the tubular member 19, as shown.

In a preferred form of the invention resistor 23 has a value of resistance substantially equal to the characteristic impedance of the coaxial transmission line it is desired to terminate. It would appear that a resistor of this value would provide a substantially flat termination; however, in practice it has been found that when in the circuit, the connections to the resistor introduce undesirable, distributed inductive reactive components. These provide an objectionable mismatch at the terminating end of the coaxial line.

It has been discovered that the above inductive components may be compensated for by varying the spacing *d* between the resistor 23 and tubular member 19. In the embodiment of the invention illustrated in Fig. 1, this is accomplished by rotating screw 22.

Figure 2:
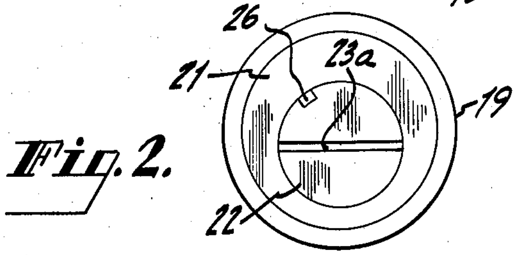
Fig. 2 is an end view of the structure of Fig. 1.

In practicing the invention the coaxial line being terminated is connected to the connector and the spacing *d* adjusted until a flat response (reflectionless termination) is achieved. The end cap may then be fixed in position by soldering or otherwise permanently securing screw 22 to end wall 21. This may be accomplished, for example, by placing solder in a small notch 26 (Fig. 2) formed in an exposed end of screw 22, or by striking between parts 21 and 22 with a punch.

In the above termination, the undesirable reactive components of the terminating resistor are compensated for by the distributed capacitance of the terminating impedance to ground. An important advantage of this type of termination over a lumped impedance type of balancing arrangement is that a match is obtained over a much broader frequency band. Other important advantages of the termination are its simplicity, low cost of manufacture and ease of adjustment.

Figure 3:
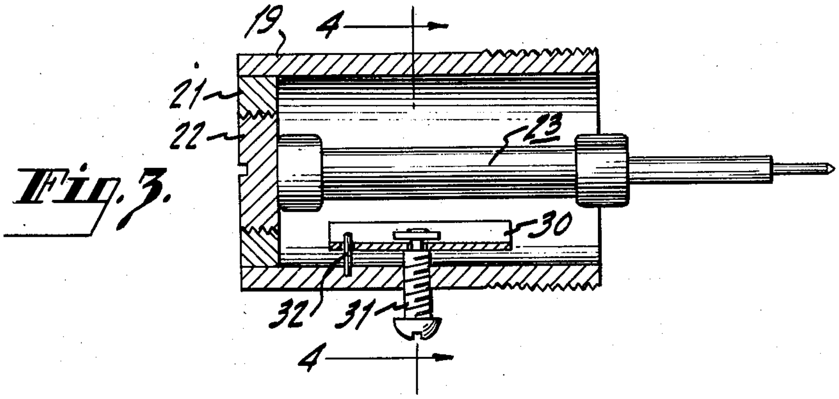
Fig. 3 is a cross-sectional view of another embodiment of the present invention.
Figure 4:
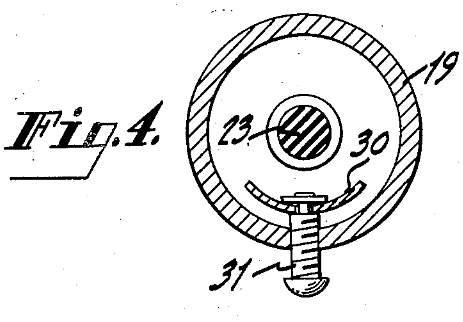
Fig. 4 is a cross-sectional view along line 4—4 of Fig. 3.

Another embodiment of the present invention is shown in Figs. 3 and 4. In Fig. 3 and also in Figs. 5 and 6 only section A of the terminating device is shown. It is to be understood that in each case section A is adapted to be connected to a conventional coaxial line connector B like the one shown in Fig. 1.

Referring now to Figs. 3 and 4, the end screw 52 is concentrically arranged in the end wall 51 rather than being off-centered. Adjustment of the distributed capacitance of resistor 23 to ground (tubular member 19) is provided by conductive member 30 and screw 31. To provide maximum capacitive effect, conductive member 30 may be formed as a portion of a hollow cylinder as shown more clearly in Fig. 4; however, it is to be understood that the invention is not limited to this shape. As the screw 31 is rotated, member 30 is moved toward or away from the resistor thereby increasing or decreasing the distributed capacitance between the resistor and ground. Rotation of member 30 is prevented by post 32 which passes through an aperture in member 30.

In the embodiment of Figs. 3 and 4, screw 22 is provided merely for ease of assembly. This screw plays no part in the adjustment of distributed capacitance and may be omitted if desired. In such case end wall 21 would not be apertured and the resistor 23 would be soldered or brazed directly onto the wall.

Figure 5:
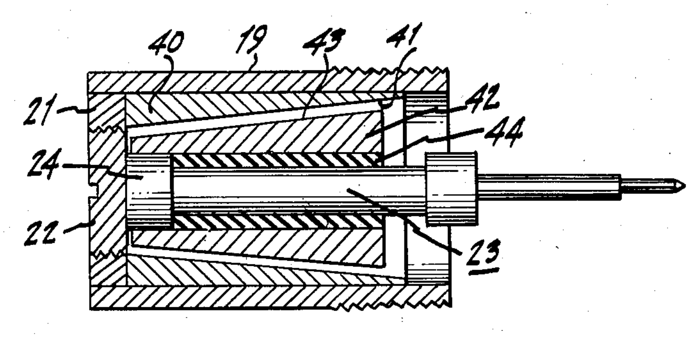
Fig. 5 is a cross-sectional view of a third embodiment of the present invention.

A third form of the invention is shown in Fig. 5 and includes a cylindrical member 40 having a conically shaped inner surface 41. Member 40 is conductively connected to the inner surface of cylindrical member 19. Resistor 23 is provided with a hollow, elongated member 42 having a conically shaped outer surface 43 spaced from surface 41 and conductively secured at one end to end cap 24 of the resistor. Member 42 is insulated from the remainder of the resistor by insulator sleeve 44.

In operation of the embodiment of the invention illustrated in Fig. 5, movement of centrally located end cap 22 changes the distributed capacitance between resistor 23 and ground. An advantage of this arrangement over the others is its much greater range of adjustment. The substantially parallel conical surfaces permit the introduction of much greater amounts of compensating distributed capacitive reactance.

Figure 6:
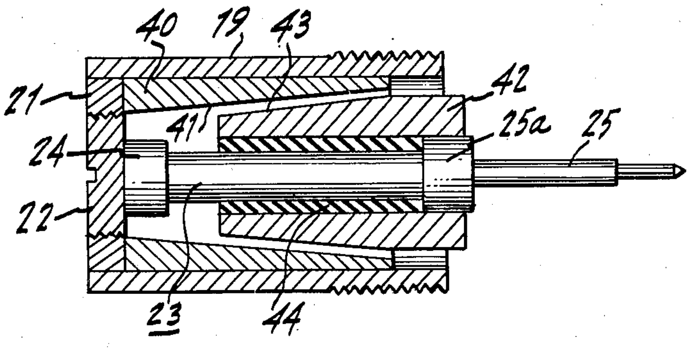
Fig. 6 is a cross-sectional view of a fourth embodiment of the present invention.

The embodiment of Fig. 6 is exactly the same as the one shown in Fig. 5 except that conical member 42 is attached to the "hot" end cap 25a of resistor 23. This provides an even greater distributed capacitance effect and therefore an even greater range of line terminating adjustment.

Figure 7:
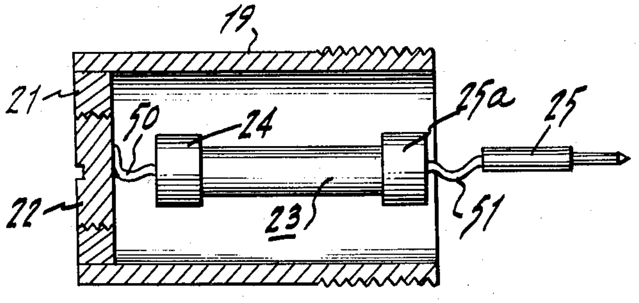
Fig. 7 is a cross-sectional view of a fifth embodiment of the present invention.

Fig. 7 illustrates a fourth embodiment of the invention and includes a fairly stiff, resilient conductive member 50 conductively connecting end cap 24 to screw 22 and a second stiff, resilient conductive member 51 connecting end cap 25a to contact 25. It is necessary that members 50 and 51 be fairly stiff to permit terminal 25 secured to the resistor to be plugged into the terminal fitting (not shown) of the coaxial line. Tightening screw 22 causes members 50 and 51 to buckle and resistor 23 to be moved toward tubular member 19 thereby increasing the distributed capacitance between the resistor and ground. In another form of the invention, member 50 and/or member 51 may be so arranged that adjustment of screw 22 merely decreases the spacing between screw 22 and end cap 24 thereby also affecting the distributed capacitance between resistor 23 and ground.

In other forms of the invention only one of the resilient member 50, 51 need be employed. In such case, clockwise rotation of screw 22 will cause the end of resistor 23 connected to the resilient member to buckle toward member 19. This increases the distributed capacitance between the resistor and ground and permits the distributed inductive reactance of the resistor to be balanced out.

What is claimed is:

1. A structure for terminating the end of a coaxial line comprising, in combination, a resistor; first connection means for conductively connecting one end of said resistor to the inner conductor of said coaxial line at said end thereof; a conductive tubular member spaced from and surrounding said resistor; second connecting means for conductively connecting one end of said tubular member to the outer conductor of said coaxial line at said end thereof; third connecting means for providing an electrical connection between the other end of said resistor and said tubular member, said third connecting means comprising a conductive cap fastened to said other end of said tubular member, and comprising adjustable means mounted in said cap for adjusting the spacing between said other end of said resistor and said tubular member; said resistor having a resistance equal to the characteristic impedance of said coaxial line, and, when connected in the manner described, a distributed inductive reactance that provides a mismatch at said end of said transmission line; and said adjustable means serving to balance out said inductive reactance by adjusting the distributed capacitance between said resistor and said tubular member.

2. A terminating structure as set forth in claim 1, wherein said end cap is formed with an off-centered aperture therethrough, said adjustable means comprising a member rotatably mounted in said aperture, and said other end of said resistor being secured to said rotatable member near an edge of said rotatable member, whereby rotation of said rotatable member changes the spacing between said other end of said resistor and said tubular member.

3. A terminating structure as set forth in claim 1, wherein said end cap is formed with an aperture therethrough, said adjustable means comprising a member mounted in said aperture and movable axially of said tubular member, and further including a relatively stiff, resilient member securing said other end of said resistor to said adjustable means, whereby movement of said adjustable means in axial direction of said tubular member adjusts the spacing between said one end of said resistor and said tubular member.

4. A terminating structure as set forth in claim 3, wherein said aperture is provided with internal threads and said adjustable means comprises a screw formed with complementary external threads whereby rotation of said screw results in axial movement of said adjustable means.

5. A terminating structure for the terminating end of a coaxial transmission line comprising, in combination, an elongated, cylindrically shaped resistor; first connection means for conductively connecting one end of said resistor to the center conductor of said transmission line at said terminating end thereof; a hollow cylindrical conductive member arranged coaxially with said resistor; second connection means for conductively connecting one end of said hollow cylindrical member to the outer conductor of said transmission line at the terminating end thereof; a conductive end cap formed with an internally threaded, off-centered aperture covering the other end of said hollow cylindrical member; and a screw member provided with external threads rotatably mounted in said aperture, the other end of said resistor being fixedly secured to said screw near a circumferential edge thereof, whereby, when said screw is rotated, the spacing and the distributed capacitance between said resistor and said hollow cylindrical member are changed.

References Cited in the file of this patent

FOREIGN PATENTS

| | | |
|---|---|---|
| 819,549 | Germany | Nov. 5, 1951 |
| 820,612 | Germany | Nov. 12, 1951 |